(12) United States Patent
Zones et al.

(10) Patent No.: US 9,259,720 B2
(45) Date of Patent: Feb. 16, 2016

(54) METHOD FOR MAKING MOLECULAR SIEVE SSZ-100

(71) Applicants: Stacey Ian Zones, San Francisco, CA (US); Dan Xie, Richmond, CA (US); Cong-Yan Chen, Kensington, CA (US); Ann Jia-Bao Liang, Walnut Creek, CA (US)

(72) Inventors: Stacey Ian Zones, San Francisco, CA (US); Dan Xie, Richmond, CA (US); Cong-Yan Chen, Kensington, CA (US); Ann Jia-Bao Liang, Walnut Creek, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 148 days.

(21) Appl. No.: 14/296,386

(22) Filed: Jun. 4, 2014

(65) Prior Publication Data
US 2015/0353366 A1    Dec. 10, 2015

(51) Int. Cl.
| | | |
|---|---|---|
| *C01B 39/48* | (2006.01) | |
| *B01J 29/70* | (2006.01) | |
| *B01J 20/18* | (2006.01) | |
| *B01J 20/30* | (2006.01) | |
| *B01J 37/03* | (2006.01) | |
| *B01J 35/02* | (2006.01) | |

(52) U.S. Cl.
CPC *B01J 29/70* (2013.01); *B01J 20/18* (2013.01); *B01J 20/3057* (2013.01); *B01J 35/02* (2013.01); *B01J 37/038* (2013.01); *C01B 39/48* (2013.01)

(58) Field of Classification Search
CPC ............ C01B 39/48; B01J 29/70; B01J 20/18
See application file for complete search history.

(56) References Cited

U.S. PATENT DOCUMENTS

| | | | | |
|---|---|---|---|---|
| 4,910,006 A | | 3/1990 | Zones et al. | |
| 5,106,801 A | * | 4/1992 | Zones ..................... | B01J 29/035 208/111.01 |
| 5,254,514 A | * | 10/1993 | Nakagawa ............... | B01J 29/04 423/706 |
| 5,268,101 A | * | 12/1993 | Anderson .......... | B01D 67/0048 210/510.1 |
| 5,271,931 A | * | 12/1993 | Lotz ..................... | A61K 38/204 424/85.1 |
| 5,340,563 A | * | 8/1994 | Zones ..................... | B01J 29/70 423/328.2 |
| 6,254,349 B1 | * | 7/2001 | Haugen ................. | F04D 29/266 415/216.1 |

(Continued)

FOREIGN PATENT DOCUMENTS

| | | |
|---|---|---|
| WO | 2010065319 | 6/2010 |
| WO | 2010088243 | 8/2010 |

OTHER PUBLICATIONS

S.I. Zones, M.M. Olmstead and D.S. Santilli "Guest/Host Relationships in the Synthesis of Large Pore Zeolite SSZ-26 from a Propellane Quaternary Ammonium Compound" J. Am. Chem. Soc. 1992, 114, 4195-4201.

(Continued)

*Primary Examiner* — David M Brunsman
(74) *Attorney, Agent, or Firm* — Terrence M. Flaherty

(57) ABSTRACT

A method for making a new crystalline molecular sieve designated SSZ-100 is disclosed. SSZ-100 is synthesized using a cationic nitrogen-containing organic compound having the following structure:

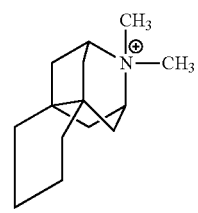

12 Claims, 3 Drawing Sheets

(56) References Cited

U.S. PATENT DOCUMENTS 7,550,073 B2 * 6/2009 Zones .................. B01J 29/86
                                                   208/113
7,648,694 B2    1/2010  Burton, Jr.
7,837,978 B2   11/2010  Burton, Jr.

OTHER PUBLICATIONS

PCT International Search Report, PCT/US2015/016523, mailed May 19, 2015.

* cited by examiner

METHOD FOR MAKING MOLECULAR SIEVE SSZ-100

TECHNICAL FIELD

This disclosure relates to a new crystalline molecular sieve designated SSZ-100, a method for preparing SSZ-100, and uses for SSZ-100.

BACKGROUND

Molecular sieve materials, both natural and synthetic, have been demonstrated in the past to be useful as adsorbents and to have catalytic properties for various types of hydrocarbon conversion reactions. Certain molecular sieves, such as zeolites, aluminophosphates, and mesoporous materials, are ordered, porous crystalline materials having a definite crystalline structure as determined by X-ray diffraction (XRD). Within the crystalline molecular sieve material there are a large number of cavities which may be interconnected by a number of channels or pores. These cavities and pores are uniform in size within a specific molecular sieve material. Because the dimensions of these pores are such as to accept for adsorption molecules of certain dimensions while rejecting those of larger dimensions, these materials have come to be known as "molecular sieves" and are utilized in a variety of industrial processes.

Although many different crystalline molecular sieves have been discovered, there is a continuing need for new molecular sieves with desirable properties for gas separation and drying, hydrocarbon conversion reactions, and other applications. New molecular sieves can contain novel internal pore architectures, providing enhanced selectivities in these processes.

U.S. Pat. No. 4,910,006 discloses the synthesis of molecular sieve SSZ-26 using a hexamethyl[4.3.3.0]propellane-8,11-diammonium cation as structure directing agent ("SDA"). In the synthesis of this SDA from [4.3.3.0]propellane-8,11-dione, it was reported that a small amount of a mono-amine impurity was also produced in the reaction sequence. The mono-amine could be carried through all steps of the synthesis of the SDA without adversely affecting the synthesis of SSZ-26.

It has now been found that this reported mono-amine impurity is a mono quaternary ammonium compound, and when used as a structure directing agent, produces a unique molecular sieve material designated SSZ-100.

SUMMARY

The present disclosure is directed to a new family of molecular sieves with unique properties, referred to herein as "molecular sieve SSZ-100" or simply "SSZ-100."

In one aspect, there is provided a molecular sieve having a mole ratio of at least 10 of (1) at least one oxide of at least one tetravalent element to (2) optionally, one or more oxides selected from the group consisting of oxides of trivalent elements, pentavalent elements, and mixtures thereof, and having, in its as-synthesized form, the X-ray diffraction lines of Table 5. It should be noted that the phrase "mole ratio of at least 10" includes the case where there is no oxide (2), i.e., the mole ratio of oxide (1) to oxide (2) is infinity. In that case, the molecular sieve is comprised of essentially all of the oxide of the one or more tetravalent elements.

In another aspect, there is provided a method of preparing a crystalline molecular sieve by contacting under crystallization conditions (1) at least one source of an oxide of at least one tetravalent element; (2) optionally, one or more sources of one or more oxides selected from the group consisting of oxides of trivalent elements, pentavalent elements, and mixtures thereof; (3) at least one source of an element selected from Groups 1 and 2 of the Periodic Table; (4) hydroxide ions; and (5) a cationic nitrogen-containing organic compound represented by the following structure:

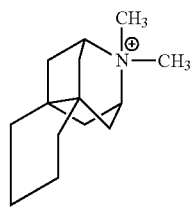

In yet another aspect, there is provided a process for preparing a crystalline molecular sieve having, in its as-synthesized form, the X-ray diffraction lines of Table 5, by: (a) preparing a reaction mixture containing (1) at least one source of an oxide of at least one tetravalent element; (2) optionally, one or more sources of one or more oxides selected from the group consisting of oxides of trivalent elements, pentavalent elements, and mixtures thereof; (3) at least one source of an element selected from Groups 1 and 2 of the Periodic Table; (4) hydroxide ions; (5) water; and (6) a cationic nitrogen-containing organic compound represented by the following structure:

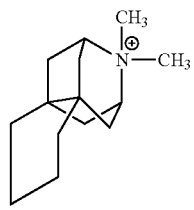

and (b) subjecting the reaction mixture to crystallization conditions sufficient to form crystals of the molecular sieve.

The present disclosure also provides SSZ-100 molecular sieves having a composition, as-synthesized and in the anhydrous state, in terms of mole ratios, as follows:

|  | Broad | Exemplary |
| --- | --- | --- |
| $TO_2/X_2O_b$ | ≥10 | 10 to 100 |
| $Q/TO_2$ | 0.02 to 0.10 | 0.02 to 0.10 |
| $M/TO_2$ | 0.02 to 0.15 | 0.02 to 0.15 | wherein: (1) T is selected from the group consisting of tetravalent elements from Groups 4-14 of the Periodic Table, and mixtures thereof; (2) X is selected from the group consisting of trivalent and pentavalent elements from Groups 3-13 of the Periodic Table, and mixtures thereof; (3) stoichiometric variable b equals the valence state of compositional variable X (e.g., when X is trivalent, b=3; when X is pentavalent, b=5); (4) M is selected from the group consisting of elements from Groups 1 and 2 of the Periodic Table; and (5) Q is a cationic nitrogen-containing organic compound represented by the following structure:

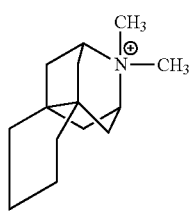

DETAILED DESCRIPTION

Introduction

Figure 1:
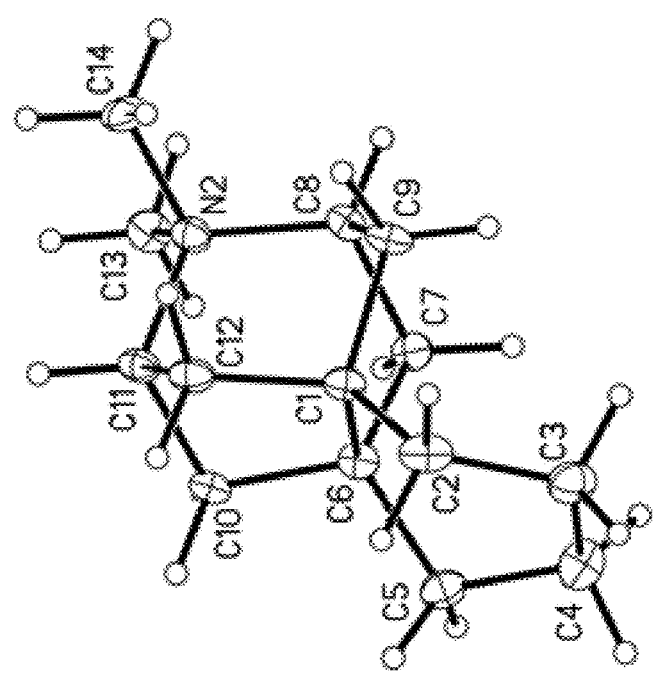
FIG. 1 depicts the structure of the SDA prepared in Example 1 drawn with 30% thermal ellipsoids as determined by single-crystal X-ray diffraction.

The term "molecular sieve" includes (a) intermediate and (b) final or target molecular sieves and molecular sieves produced by (1) direct synthesis or (2) post-crystallization treatment (secondary synthesis). Secondary synthesis techniques allow for the synthesis of a target material from an intermediate material by heteroatom lattice substitution or other techniques. For example, an aluminosilicate can be synthesized from an intermediate borosilicate by post-crystallization heteroatom lattice substitution of the boron for aluminum. Such techniques are known, for example as described in U.S. Pat. No. 6,790,433.

As used herein, the numbering scheme for the Periodic Table Groups is as disclosed in *Chem. Eng. News*, 63(5), 27 (1985).

In preparing SSZ-100, a cationic nitrogen-containing organic compound represented by the flowing structure (1) is used as the structure directing agent ("SDA"), also known as a crystallization template:

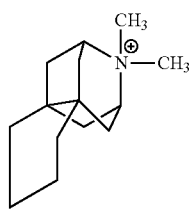

(1)

The SDA cation is associated with anions which can be any anion that is not detrimental to the formation of SSZ-100. Representative anions include elements from Group 17 of the Periodic Table (e.g., fluoride, chloride, bromide and iodide), hydroxide, acetate, sulfate, tetrafluoroborate, carboxylate, and the like.

Reaction Mixture

In general, molecular sieve SSZ-100 is prepared by: (a) preparing a reaction mixture containing (1) at least one source of an oxide of at least one tetravalent element; (2) optionally, one or more sources of one or more oxides selected from the group consisting of oxides of trivalent elements, pentavalent elements, and mixtures thereof; (3) at least one source of an element selected from Groups 1 and 2 of the Periodic Table; (4) hydroxide ions; (5) water; and (6) a cationic nitrogen-containing organic compound represented by the following structure

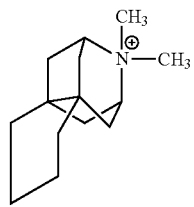

and (b) subjecting the reaction mixture to crystallization conditions sufficient to form crystals of the molecular sieve.

The composition of the reaction mixture from which the molecular sieve is formed, in terms of mole ratios, is identified in Table 1 below, wherein compositional variables T, X, M, and Q and stoichiometric variable b are as described herein above.

TABLE 1

| Components | Broad | Exemplary |
|---|---|---|
| $TO_2/X_2O_b$ | ≥10 | 10 to 100 |
| $M/TO_2$ | 0.05 to 0.50 | 0.15 to 0.30 |
| $Q/TO_2$ | 0.05 to 0.50 | 0.05 to 0.25 |
| $OH/TO_2$ | 0.10 to 1.0 | 0.10 to 0.50 |
| $H_2O/TO_2$ | 15 to 300 | 25 to 60 |

In one sub-embodiment, the composition of the reaction mixture from which SSZ-100 is formed, in terms of mole ratios, is identified in Table 2 below, wherein compositional variables M and Q are as described herein above.

TABLE 2

| Components | Broad | Exemplary |
|---|---|---|
| $SiO_2/Al_2O_3$ | ≥10 | 10 to 100 |
| $M/SiO_2$ | 0.05 to 0.50 | 0.15 to 0.30 |
| $Q/SiO_2$ | 0.05 to 0.50 | 0.05 to 0.25 |
| $OH/SiO_2$ | 0.10 to 1.0 | 0.10 to 0.50 |
| $H_2O/SiO_2$ | 15 to 300 | 25 to 60 |

As noted above, for each embodiment described herein, T is selected from the group consisting of tetravalent elements from Groups 4-14 of the Periodic Table. In one sub-embodiment, T is selected from the group consisting of silicon (Si), germanium (Ge), titanium (Ti), and mixtures thereof. In another sub-embodiment, T is selected from the group consisting of Si, Ge, and mixtures thereof. In one sub-embodiment, T is Si. Sources of elements selected for compositional variable T include oxides, hydroxides, acetates, oxalates, ammonium salts and sulfates of the element(s) selected for T. In one sub-embodiment, each source(s) of the element(s) selected for composition variable T is an oxide. Where T is Si, sources useful for Si include fumed silica, precipitated silicates, silica hydrogel, silicic acid, colloidal silica, tetra-alkyl orthosilicates (e.g., tetraethyl orthosilicate), and silica hydroxides. Sources useful herein for Ge include germanium oxide and germanium ethoxide.

For each embodiment described herein, X is selected from the group consisting of trivalent and pentavalent elements from Groups 3-13 of the Periodic Table. In one sub-embodiment, X is selected from the group consisting of boron (B), aluminum (Al), gallium (Ga), indium (In), iron (Fe), and mixtures thereof. In another sub-embodiment, X is selected from the group consisting of B, Al, Ga, In, and mixtures thereof. In one sub-embodiment X is Al. Sources of elements selected for compositional variable X include oxides, hydroxides, acetates, oxalates, ammonium salts and sulfates of the element(s) selected for X. Where X is Al, sources useful for Al include aluminates, alumina, and aluminum compounds such as $AlCl_3$, $Al_2(SO_4)_3$, $Al(OH)_3$, kaolin clays, and other zeolites. An example of the source of aluminum oxide is LZ-210 zeolite (a type of Y zeolite). Boron, gallium, indium, titanium, and iron can be added in forms corresponding to their aluminum and silicon counterparts.

As described herein above, for each embodiment described herein, the reaction mixture can be formed using at least one source of an element selected from Groups 1 and 2 of the Periodic Table (referred to herein as M). In one sub-embodiment, the reaction mixture is formed using a source of an element from Group 1 of the Periodic Table. In another sub-embodiment, the reaction mixture is formed using a source of sodium (Na). Any M-containing compound which is not detrimental to the crystallization process is suitable. Sources for such Groups 1 and 2 elements include oxides, hydroxides, nitrates, sulfates, halides, oxalates, citrates and acetates thereof.

For each embodiment described herein, the molecular sieve reaction mixture can be supplied by more than one source. Also, two or more reaction components can be provided by one source.

The reaction mixture can be prepared either batch wise or continuously. Crystal size, morphology and crystallization time of the molecular sieve described herein can vary with the nature of the reaction mixture and the crystallization conditions.

Crystallization and Post-Synthesis Treatment

In practice, the molecular sieve is prepared by: (a) preparing a reaction mixture as described herein above; and (b) subjecting the reaction mixture to crystallization conditions sufficient to form crystals of the molecular sieve.

The reaction mixture is maintained at an elevated temperature until the crystals of the molecular sieve are formed. The hydrothermal crystallization is usually conducted under pressure, and usually in an autoclave so that the reaction mixture is subject to autogenous pressure, at a temperature between 125° C. and 200° C.

The reaction mixture can be subjected to mild stirring or agitation during the crystallization step. It will be understood by the skilled artisan that the molecular sieves described herein can contain impurities, such as amorphous materials, unit cells having framework topologies which do not coincide with the molecular sieve, and/or other impurities (e.g., organic hydrocarbons).

During the hydrothermal crystallization step, the molecular sieve crystals can be allowed to nucleate spontaneously from the reaction mixture. The use of crystals of the molecular sieve as seed material can be advantageous in decreasing the time necessary for complete crystallization to occur. In addition, seeding can lead to an increased purity of the product obtained by promoting the nucleation and/or formation of the molecular sieve over any undesired phases. When used as seeds, seed crystals are added in an amount between 1% and 10% of the weight of the source for compositional variable T used in the reaction mixture.

Once the molecular sieve crystals have formed, the solid product is separated from the reaction mixture by standard mechanical separation techniques such as filtration. The crystals are water-washed and then dried to obtain the as-synthesized molecular sieve crystals. The drying step can be performed at atmospheric pressure or under vacuum.

The molecular sieve can be used as-synthesized, but typically will be thermally treated (calcined). The term "as-synthesized" refers to the molecular sieve in its form after crystallization, prior to removal of the SDA cation. The SDA can be removed by thermal treatment (e.g., calcination), preferably in an oxidative atmosphere (e.g., air, gas with an oxygen partial pressure of greater than 0 kPa) at a temperature readily determinable by the skilled artisan sufficient to remove the SDA from the molecular sieve. The SDA can also be removed by photolysis techniques (e.g., exposing the SDA-containing molecular sieve product to light or electromagnetic radiation that has a wavelength shorter than visible light under conditions sufficient to selectively remove the organic compound from the molecular sieve) as described in U.S. Pat. No. 6,960, 327.

The molecular sieve can subsequently be calcined in steam, air or inert gas at temperatures ranging from 200° C. to 800° C. for periods of time ranging from 1 to 48 hours, or more. Usually, it is desirable to remove the extra-framework cation (e.g., $Na^+$) by ion exchange and replace it with hydrogen, ammonium, or any desired metal-ion.

Where the molecular sieve formed is an intermediate material, the target molecular sieve can be achieved using post-synthesis techniques such as heteroatom lattice substitution techniques. The target molecular sieve can also be achieved by removing heteroatoms from the lattice by known techniques such as acid leaching.

The molecular sieve made from the process disclosed herein can be formed into a wide variety of physical shapes. Generally speaking, the molecular sieve can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the molecular sieve can be extruded before drying or dried (or partially dried) and then extruded.

The molecular sieve can be composited with other materials resistant to the temperatures and other conditions employed in organic conversion processes. Such matrix materials include active and inactive materials and synthetic or naturally occurring zeolites as well as inorganic materials such as clays, silica and metal oxides. Examples of such materials and the manner in which they can be used are disclosed in U.S. Pat. Nos. 4,910,006 and 5,316,753.

Characterization of the Molecular Sieve

Molecular sieves made by the process disclosed herein have a composition, as-synthesized and in the anhydrous state, as described in Table 3 (in terms of mole ratios), wherein compositional variables T, X, Q and M and stoichiometric variable b are as described herein above:

TABLE 3

|  | Broad | Exemplary |
| --- | --- | --- |
| $TO_2/X_2O_b$ | ≥10 | 10 to 100 |
| $Q/TO_2$ | 0.02 to 0.10 | 0.02 to 0.10 |
| $M/TO_2$ | 0.02 to 0.15 | 0.02 to 0.15 |

In one sub-embodiment, the molecular sieves made by the process disclosed herein have a composition, as-synthesized and in the anhydrous state, as described in Table 4 (in terms of mole ratios), wherein compositional variables Q and M are as described herein above:

TABLE 4

|  | Broad | Exemplary |
|---|---|---|
| $SiO_2/Al_2O_3$ | ≥10 | 10 to 100 |
| $Q/SiO_2$ | 0.02 to 0.10 | 0.02 to 0.10 |
| $M/SiO_2$ | 0.02 to 0.15 | 0.02 to 0.15 |

Molecular sieves synthesized by the process disclosed herein are characterized by their XRD pattern. The X-ray diffraction pattern lines of Table 5 are representative of as-synthesized SSZ-100 made in accordance with this disclosure. Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation. Calcination can also cause minor shifts in the XRD pattern. Notwithstanding these minor perturbations, the basic crystal lattice structure remains unchanged.

TABLE 5

Characteristic Peaks for As-Synthesized SSZ-100

| 2-Theta[a] | d-Spacing, nm | Relative Intensity[b] |
|---|---|---|
| 8.50 | 1.039 | M |
| 8.99 | 0.983 | S |
| 9.99 | 0.885 | M |
| 12.43 | 0.712 | W |
| 14.06 | 0.630 | W |
| 15.88 | 0.558 | VS |
| 17.68 | 0.501 | VS |
| 18.56 | 0.478 | VS |
| 19.35 | 0.458 | VS |
| 19.94 | 0.445 | VS |
| 20.87 | 0.425 | W |
| 22.80 | 0.390 | M |
| 23.36 | 0.381 | W |
| 24.74 | 0.360 | M |
| 24.99 | 0.356 | VS |

[a] ±0.20
[b] The powder XRD patterns provided are based on a relative intensity scale in which the strongest line in the X-ray pattern is assigned a value of 100: W = weak (>0 to ≤20); M = medium (>20 to ≤40); S = strong (>40 to ≤60); VS = very strong (>60 to ≤100).

The X-ray diffraction pattern lines of Table 6 are representative of calcined SSZ-100 made in accordance with this disclosure.

TABLE 6

Characteristic Peaks for Calcined SSZ-100

| 2-Theta[a] | d-Spacing, nm | Relative Intensity[b] |
|---|---|---|
| 8.48 | 1.041 | VS |
| 8.98 | 0.984 | VS |
| 10.04 | 0.880 | S |
| 12.38 | 0.714 | W |
| 14.17 | 0.625 | W |
| 15.85 | 0.559 | S |
| 17.07 | 0.519 | W |
| 17.64 | 0.503 | M |
| 18.68 | 0.475 | S |
| 19.44 | 0.456 | W |
| 19.78 | 0.449 | M |
| 19.98 | 0.444 | S |
| 20.22 | 0.439 | W |
| 21.30 | 0.417 | W |
| 22.80 | 0.390 | M |

TABLE 6-continued

Characteristic Peaks for Calcined SSZ-100

| 2-Theta[a] | d-Spacing, nm | Relative Intensity[b] |
|---|---|---|
| 23.06 | 0.385 | M |
| 24.29 | 0.366 | W |
| 24.99 | 0.356 | VS |

[a] ±0.20
[b] The powder XRD patterns provided are based on a relative intensity scale in which the strongest line in the X-ray pattern is assigned a value of 100: W = weak (>0 to ≤20); M = medium (>20 to ≤40); S = strong (>40 to ≤60); VS = very strong (>60 to ≤100).

The powder X-ray diffraction patterns presented herein were collected by standard techniques. The radiation was $CuK_\alpha$ radiation. The peak heights and the positions, as a function of 2θ where θ is the Bragg angle, were read from the relative intensities of the peaks (adjusting for background), and d, the interplanar spacing corresponding to the recorded lines, can be calculated.

Processes Using SSZ-100

SSZ-100 is useful as an adsorbent for gas separations. SSZ-100 can also be used as a catalyst for converting oxygenates (e.g., methanol) to olefins and for making small amines. SSZ-100 can be used to reduce oxides of nitrogen in a gas streams, such as automobile exhaust. SSZ-100 can also be used to as a cold start hydrocarbon trap in combustion engine pollution control systems. SSZ-100 is particularly useful for trapping $C_3$ fragments.

EXAMPLES

The following illustrative examples are intended to be non-limiting.

Example 1

Synthesis of SDA

The SDA was prepared according to Zones et al., *J. Am. Chem. Soc.* 1992, 114, 4195-4201. The SDA can be isolated as eluting faster off a column than the diquaternary SDA used for synthesizing SSZ-26. The iodide product was then hydroxide-exchanged by dissolving the solid in a 5-fold mass excess of water, adding a 2.5-fold mass excess of AG® 1-X8 anion exchange resin (Bio-Rad Laboratories), and allowing the ion-exchange to occur overnight. The solution was filtered and the resin was washed with another $¼^{th}$ proportion (relative to the start) of water. The combined aqueous fractions were titrated with 0.1N HCl to determine the hydroxide concentration.

The molecular structure of the SDA was determined by single-crystal X-ray diffraction using standard techniques and is depicted in FIG. 1.

Example 2

Synthesis of SSZ-100

CAB-O-SIL® M5 fumed silica (Cabot Corp.), a FAU zeolite ($SiO_2/Al_2O_3$ mole ratio=5), a hydroxide solution of the SDA synthesized per Example 1, 1 N NaOH, and deionized were mixed together in a Teflon liner. The composition of the reaction mixture, in terms of mole ratios, is reported in Table 7.

TABLE 7

| Reaction Mixture Composition | |
| --- | --- |
| SiO$_2$/Al$_2$O$_3$ | 35 |
| Q/SiO$_2$ | 0.20 |
| OH/SiO$_2$ | 0.15 |
| H$_2$O/SiO$_2$ | 30 |

The Teflon liner was then capped and sealed within a steel Parr autoclave. The autoclave was placed on a spit within a convection oven at 160° C. The autoclave was tumbled at 43 rpm for a week in the heated oven. The autoclave was then removed and allowed to cool to room temperature. The solids were then recovered by filtration and washed thoroughly with deionized water. The solids were allowed to dry at room temperature.

Figure 2:
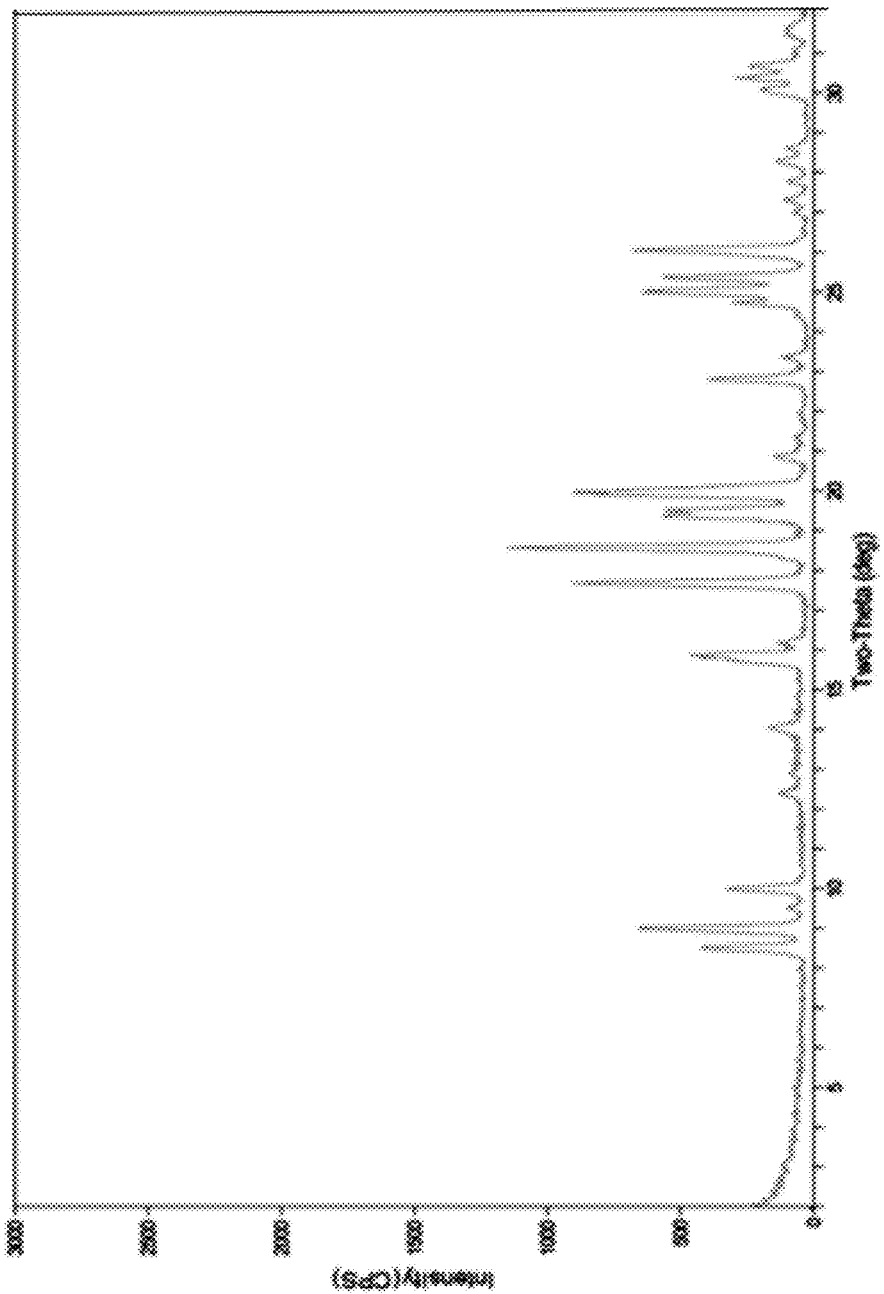
FIG. 2 is a powder XRD pattern of the as-synthesized molecular sieve prepared in Example 2.

The powder XRD pattern of the resulting product is shown in FIG. 2.

Elemental analysis indicated the product contained 33.2% Si and 2.67% Al.

Example 3

Calcination of SSZ-100

Figure 3:
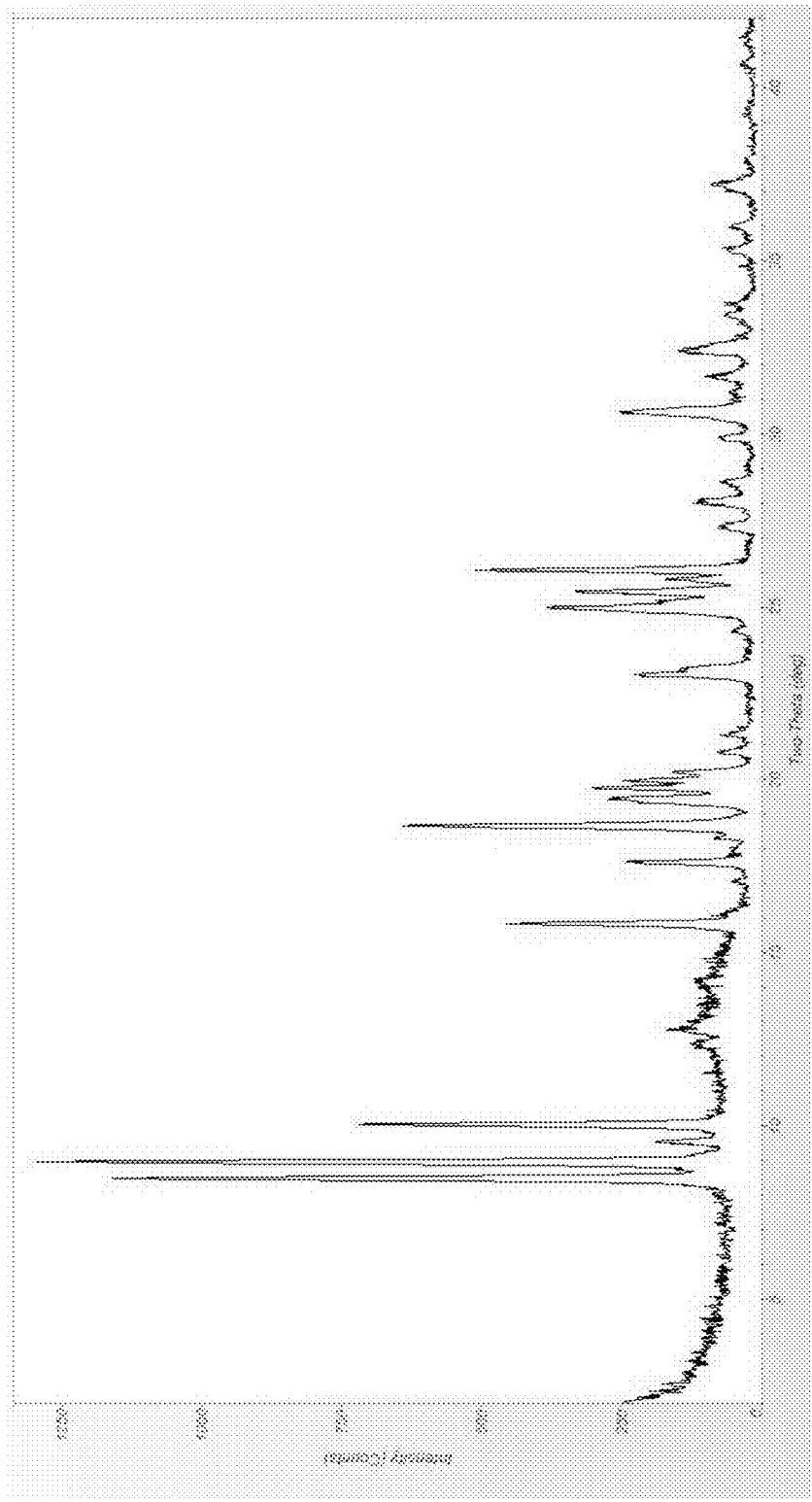
FIG. 3 is a powder XRD pattern of the calcined molecular sieve prepared in Example 3.

The resulting product was calcined inside a muffle furnace under a flow of air heated to 595° C. at a rate of 1° C./minute and held at 595° C. for 5 hours, cooled and then analyzed by powder XRD. The powder XRD pattern of the resulting product is shown in FIG. 3. The powder XRD pattern indicates that the material remains stable after calcination to remove the organic SDA.

Example 3

Micropore Volume Analysis

Calcined SSZ-100 was subjected to a surface area and micropore volume analysis using N$_2$ as adsorbate and via the BET method. The zeolite exhibited a considerable void volume with a micropore volume of 0.22 cm$^3$/g. This is consistent with the SDA filling about 18 wt. % for the as-synthesized SSZ-100.

No n-hexane uptake for calcined SSZ-100 was observed at room temperature indicating that SSZ-100 is a small pore molecular sieve (i.e., a molecular sieve having a pore size of from 3 Å to less than 5.0 Å).

Example 4

Ammonium-Ion Exchange of SSZ-100

The Na$^+$ form of calcined SSZ-100 was converted to the NH$_4^+$ form of SSZ-100 by heating the material in an aqueous solution of NH$_4$NO$_3$ (typically, 1 g of NH$_4$NO$_3$/1 g of SSZ-100 in 20 mL of deionized H$_2$O) at 90° C. for 2-3 hours. The mixture was then filtered and the step was repeated as many times as desired (usually done 2-3 times). After filtration, the obtained NH$_4^+$-exchanged product was washed with deionized water and air dried. The NH$_4^+$ form of SSZ-100 can be converted to the H form by calcination to 540° C.

Example 5

Constraint Index Test

The H$^+$ form of SSZ-100 prepared per Example 4 was pelletized at 4 kpsi, crushed and granulated to 20-40 mesh. A 0.6 g sample of the granulated material was calcined in air at 540° C. for 4 hours and cooled in a desiccator to ensure dryness. Then, 0.47 g of material was packed into a ¼ inch stainless steel tube with alundum on both sides of the molecular sieve bed. A furnace (Applied Test Systems, Inc.) was used to heat the reactor tube. Nitrogen was introduced into the reactor tube at 9.4 mL/min and at atmospheric pressure. The reactor was heated to about 800° F. (427° C.), and a 50/50 feed of n-hexane and 3-methylpentane was introduced into the reactor at a rate of 8 μL/min. The feed was delivered by an ISCO pump. Direct sampling into a GC began after 15 minutes of feed introduction. Test data results after 15 minutes on stream (800° F.) are presented in Table 8.

TABLE 8

| Constraint Index Test Results | |
| --- | --- |
| n-Hexane Conversion (%) | 11.2 |
| 3-MP Conversion (%) | 0.3 |
| Feed Conversion (%) | 5.7 |
| Constraint Index (excluding 2-MP) | 35.29 |
| Constraint Index (including 2-MP) | 63.66 |

MP = methylpentane

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A method for preparing molecular sieve SSZ-100, comprising:
    (a) preparing a reaction mixture containing (1) at least one source of at least one oxide of a tetravalent element; (2) optionally, one or more sources of one or more oxides selected from the group consisting of oxides of trivalent elements, pentavalent elements, and mixtures thereof; (3) at least one source of an element selected from Groups 1 and 2 of the Periodic Table; (4) hydroxide ions; (5) water; and (6) a cationic nitrogen-containing organic compound represented by the following structure:

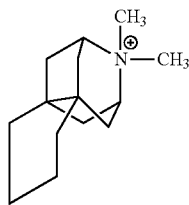

and (b) subjecting the reaction mixture to crystallization condition sufficient to form crystals of the molecular sieve.

2. The method of claim 1, wherein the molecular sieve is prepared from a reaction mixture comprising, in terms of mole ratios, the following:

| | |
|---|---|
| $TO_2/X_2O_b$ | ≥10 |
| $M/TO_2$ | 0.05 to 0.50 |
| $Q/TO_2$ | 0.05 to 0.50 |
| $OH/TO_2$ | 0.10 to 1.0 |
| $H_2O/TO_2$ | 15 to 300 | wherein:
(1) T is selected from the group consisting of tetravalent elements from Groups 4-14 of the Periodic Table, and mixtures thereof;
(2) X is selected from the group consisting of trivalent and pentavalent elements from Groups 3-13 of the Periodic Table, and mixtures thereof;
(3) b equals the valence state of X;
(4) M is selected from the group consisting of elements from Groups 1 and 2 of the Periodic Table; and
(5) Q is a cationic nitrogen-containing organic compound represented by the following structure:

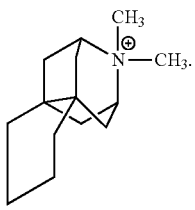

3. The method of claim 2, wherein T is selected from Si, Ge, and mixtures thereof.
4. The method of claim 2, wherein X is selected from B, Al, Ga, In, and mixtures thereof.
5. The method of claim 2, T is Si and X is Al.
6. The method of claim 2, wherein the molecular sieve is prepared from a reaction mixture comprising, in terms of mole ratios, the following:

| | |
|---|---|
| $TO_2/X_2O_b$ | 10 to 100 |
| $M/TO_2$ | 0.15 to 0.30 |
| $Q/TO_2$ | 0.05 to 0.25 |
| $OH/TO_2$ | 0.10 to 0.50 |
| $H_2O/TO_2$ | 25 to 60. |

7. The method of claim 1, wherein the molecular sieve has, in its as-synthesized form, an X-ray diffraction pattern substantially as shown in the following Table:

| 2-Theta | d-Spacing, nm | Relative Intensity |
|---|---|---|
| 8.50 ± 0.20 | 1.039 | M |
| 8.99 ± 0.20 | 0.983 | S |
| 9.99 ± 0.20 | 0.885 | M |
| 12.43 ± 0.20 | 0.712 | W |
| 14.06 ± 0.20 | 0.630 | W |
| 15.88 ± 0.20 | 0.558 | VS |
| 17.68 ± 0.20 | 0.501 | VS |
| 18.56 ± 0.20 | 0.478 | VS |
| 19.35 ± 0.20 | 0.458 | VS |
| 19.94 ± 0.20 | 0.445 | VS |
| 20.87 ± 0.20 | 0.425 | W |
| 22.80 ± 0.20 | 0.390 | M |
| 23.36 ± 0.20 | 0.381 | W |
| 24.74 ± 0.20 | 0.360 | M |
| 24.99 ± 0.20 | 0.356 | VS. |

8. The method of claim 1, wherein the molecular sieve has a composition, as-synthesized and in the anhydrous form, in terms of mole ratios, as follows:

| | |
|---|---|
| $TO_2/W_2O_b$ | ≥10 |
| $Q/TO_2$ | 0.02 to 0.10 |
| $M/TO_2$ | 0.02 to 0.15 |

(1) T is selected from the group consisting of tetravalent elements from Groups 4-14 of the Periodic Table, and mixtures thereof;
(2) X is selected from the group consisting of trivalent and pentavalent elements from Groups 3-13 of the Periodic Table, and mixtures thereof;
(3) b equals the valence state of X;
(4) M is selected from the group consisting of elements from Groups 1 and 2 of the Periodic Table; and
(5) Q is a cationic nitrogen-containing organic compound represented by the following structure:

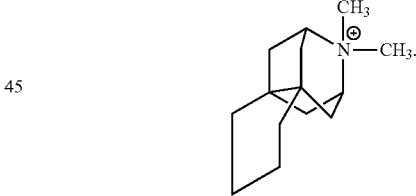

9. The method of claim 8, wherein T is selected from Si, Ge, and mixtures thereof.
10. The method of claim 8, wherein X is selected from B, Al, Ga, In, and mixtures thereof.
11. The method of claim 8, T is Si and X is Al.
12. The method of claim 8, wherein the molecular sieve has a composition, as-synthesized and in the anhydrous state, in terms of mole ratios, as follows:

| | |
|---|---|
| $TO_2/W_2O_b$ | 10 to 100 |
| $Q/TO_2$ | 0.02 to 0.10 |
| $M/TO_2$ | 0.02 to 0.15. |

* * * * *